(12) United States Patent
Reese

(10) Patent No.: US 10,945,422 B2
(45) Date of Patent: Mar. 16, 2021

(54) FISHING POLE CADDY AND FISHING POLE HOLDER ASSEMBLY

(71) Applicant: Jackie Reese, Henderson, NV (US)

(72) Inventor: Jackie Reese, Henderson, NV (US)

( * ) Notice: Subject to any disclaimer, the term of this patent is extended or adjusted under 35 U.S.C. 154(b) by 0 days.

(21) Appl. No.: 16/441,240

(22) Filed: Jun. 14, 2019

(65) Prior Publication Data

US 2020/0390076 A1  Dec. 17, 2020

(51) Int. Cl.
*A01K 97/10* (2006.01)
*A45F 3/10* (2006.01)
*A47B 81/00* (2006.01)

(52) U.S. Cl.
CPC ............. *A01K 97/10* (2013.01); *A45F 3/10* (2013.01); *A47B 81/005* (2013.01)

(58) Field of Classification Search
CPC .......... A01K 97/10; A45F 3/10; A47B 81/005
USPC ....... 248/688, 512, 511, 513, 518, 519, 520, 248/523, 528, 529, 530, 532, 533, 89, 248/111, 156, 370, 163.1, 166; 294/143; 224/922; 211/70.8, 64, 60.1; 43/21.2, 43/18.1 R
See application file for complete search history.

(56) References Cited

U.S. PATENT DOCUMENTS

| 256,811 | A | * | 4/1882 | Smith | A47G 25/12 211/62 |
| 2,987,109 | A | * | 6/1961 | Sohmer | A63B 55/10 294/143 |
| 3,186,666 | A | * | 6/1965 | Williams | F16M 7/00 248/520 |
| 3,215,181 | A | * | 11/1965 | Robert | A63B 55/10 211/70.2 |
| 3,701,504 | A | * | 10/1972 | Woods | A01K 97/10 248/513 |
| 4,014,466 | A | * | 3/1977 | Wess | A01K 97/08 294/162 |
| 4,133,131 | A | * | 1/1979 | Davy | A01K 97/10 211/70.8 |
| 4,479,322 | A | * | 10/1984 | Koppel | A01K 97/10 248/513 |
| 4,523,403 | A | * | 6/1985 | Ivy | A01K 97/125 43/17 |
| 4,684,091 | A | * | 8/1987 | Moreschi | F16M 11/046 211/182 |
| 4,779,914 | A | * | 10/1988 | Friedline | A01K 97/10 211/198 |

(Continued)

*Primary Examiner* — Terrell L McKinnon
*Assistant Examiner* — Michael McDuffie

(57) ABSTRACT

A fishing pole caddy and fishing pole holder assembly for transporting and positioning fishing poles includes a first frame that is pivotally coupled to a second frame. The first and second frames are configured to be selectively positioned in a stowed configuration, with the first and second frames substantially parallel and abutting, and a deployed configuration wherein the second frame extends transversely from the first frame. In the deployed configuration, the first and second frames are inverted V-shaped and the first frame is configured to support a fishing pole for fishing. Each of a plurality of arms is coupled to and extends from the first frame proximate to a first side of the first frame. The arm is horizontally aligned with an associated arm that is positioned proximate to a second side of the first frame so that the arms are configured to support a fishing pole for transport.

15 Claims, 7 Drawing Sheets

(56) References Cited

U.S. PATENT DOCUMENTS

| | | | | |
|---|---|---|---|---|
| 5,071,048 | A | * | 12/1991 | Price ................. A01K 97/08 224/247 |
| D372,142 | S | * | 7/1996 | Selby ..................... D3/315 |
| D372,143 | S | | 7/1996 | Selby |
| 5,533,295 | A | * | 7/1996 | Hochberger ........... A01K 97/10 248/512 |
| 5,571,227 | A | | 11/1996 | Pisarek |
| 5,803,519 | A | | 9/1998 | Daigle |
| 6,179,256 | B1 | * | 1/2001 | Utterback ............. A63B 55/10 211/198 |
| 6,607,077 | B2 | * | 8/2003 | Feeney .................... A45F 3/14 206/315.7 |
| 6,983,560 | B2 | * | 1/2006 | Williams ............... A01K 97/10 248/512 |
| 7,159,354 | B1 | * | 1/2007 | White .................... A01K 97/10 248/512 |
| 8,002,126 | B1 | * | 8/2011 | Drum ..................... B63B 32/00 211/85.7 |
| 8,757,399 | B2 | * | 6/2014 | Wolfbauer ........... A47B 81/005 211/70.8 |
| 9,498,059 | B1 | * | 11/2016 | Bock ...................... A01K 97/08 |
| 9,526,236 | B2 | * | 12/2016 | Coker .................... A01K 97/08 |
| 2006/0163893 | A1 | * | 7/2006 | Gascoigne ............. A63B 55/00 294/143 |
| 2013/0186845 | A1 | | 7/2013 | Harris |
| 2016/0045024 | A1 | * | 2/2016 | Roberts ................ A47F 7/0028 248/512 |
| 2016/0143437 | A1 | * | 5/2016 | Gabriel .................... A45F 3/08 224/153 |

* cited by examiner

US 10,945,422 B2

FISHING POLE CADDY AND FISHING POLE HOLDER ASSEMBLY

CROSS-REFERENCE TO RELATED APPLICATIONS

Not Applicable

Statement Regarding Federally Sponsored Research or Development

Not Applicable

The Names of the Parties to a Joint Research Agreement

Not Applicable

Incorporation-by-Reference of Material Submitted on a Compact Disc or as a Text File Via the Office Electronic Filing System Not Applicable

Statement Regarding Prior Disclosures by the Inventor or Joint Inventor

Not Applicable

BACKGROUND OF THE INVENTION

(1) Field of the Invention

(2) Description of Related Art including information disclosed under 37 CFR 1.97 and 1.98

The disclosure and prior art relate to caddy and holder assemblies and more particularly pertain to a new caddy and holder assembly for transporting and positioning fishing poles.

BRIEF SUMMARY OF THE INVENTION

An embodiment of the disclosure meets the needs presented above by generally comprising a first frame that is pivotally coupled to a second frame. The first and second frames are configured to be selectively positioned in a stowed configuration, with the first and second frames substantially parallel and abutting, and a deployed configuration wherein the second frame extends transversely from the first frame. In the deployed configuration, the first and second frames are inverted V-shaped and the first frame is configured to support a fishing pole for fishing. Each of a plurality of arms is coupled to and extends from the first frame proximate to a first side of the first frame. The arm is horizontally aligned with an associated arm that is positioned proximate to a second side of the first frame so that the arms are configured to support a fishing pole for transport.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
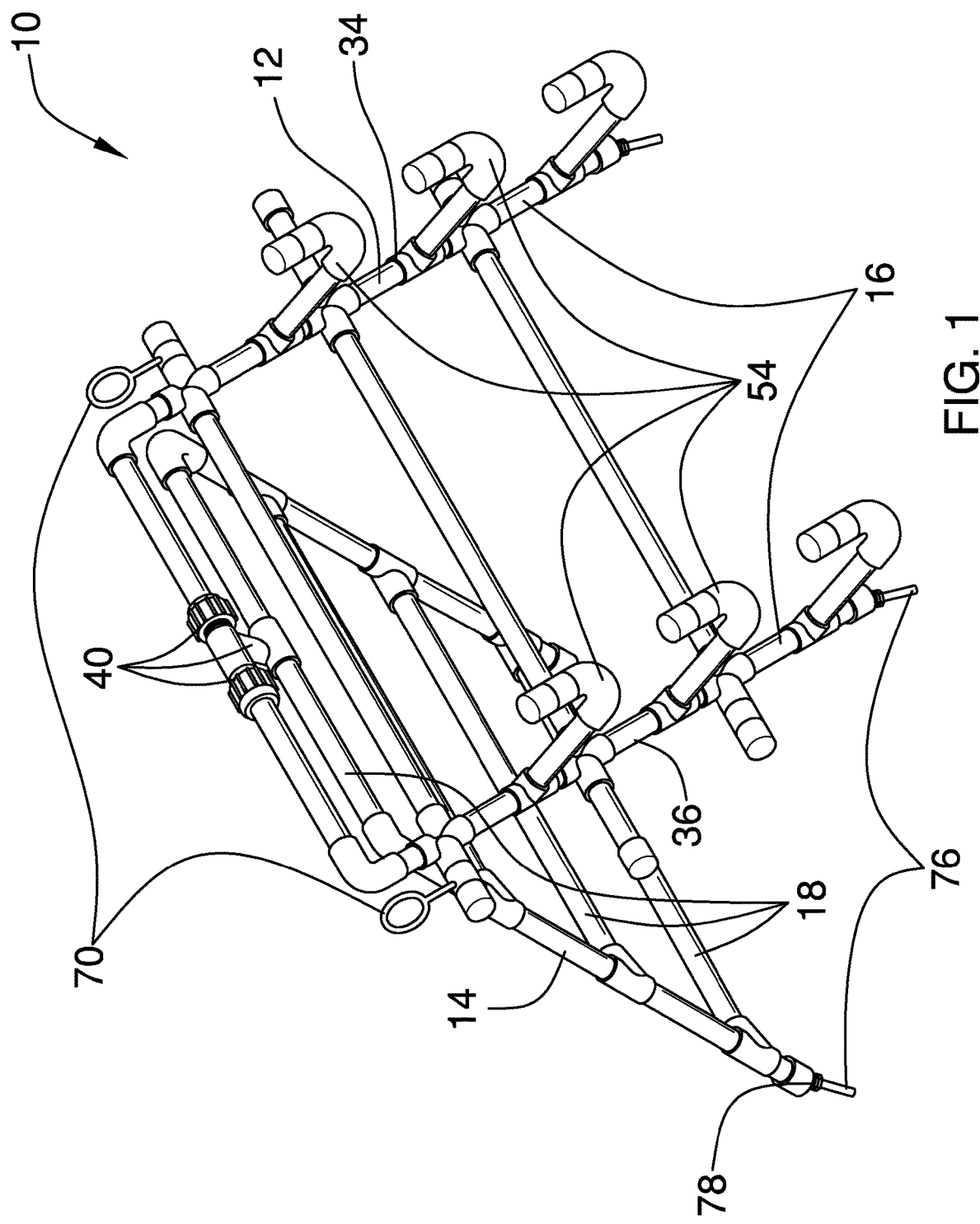
FIG. 1 is an isometric perspective view of a fishing pole caddy and fishing pole holder assembly according to an embodiment of the disclosure.

With reference now to the drawings, and in particular to FIGS. 1 through 8 thereof, a new caddy and holder assembly embodying the principles and concepts of an embodiment of the disclosure and generally designated by the reference numeral 10 will be described.

As best illustrated in FIGS. 1 through 8, the fishing pole caddy and fishing pole holder assembly 10 generally comprises a first frame 12 that is pivotally coupled to a second frame 14. The first frame 12 and the second frame 14 are configured to be selectively positioned in a stowed configuration, with the first frame 12 and the second frame 14 substantially parallel and abutting, and a deployed configuration wherein the second frame 14 extends transversely from the first frame 12. In the deployed configuration, the first frame 12 and the second frame 14 are inverted V-shaped and the first frame 12 is configured to support a fishing pole for fishing.

The first frame 12 and the second frame 14 each comprise a pair of side members 16 and a plurality of crossmembers 18. Each crossmember 18 is coupled to and extends between the pair of side members 16 so that the first frame 12 and the second frame 14 both are substantially rectangularly shaped.

The plurality of crossmembers 18 comprises an upper member 20, a lower member 22, and a plurality of medial members 24. The upper member 20 of the first frame 12 defines an upper end 26 of the first frame 12. The upper member 20 of the second frame 14 defines an upper limit 28 of the second frame 14. The lower member 22 of the first frame 12 is positioned proximate to a lower end 30 of the first frame 12. The lower member 22 of the second frame 14 is positioned proximate to a lower limit 32 of the second frame 14.

The plurality of medial members 24 may comprise from one to four medial members 24. The plurality of medial members 24 may comprise two medial members 24. The medial members 24 of the first frame 12 extends past a first side 34 and a second side 36 of the first frame 12 so that opposing terminal sections 38 of each medial member 24 are configured to hang articles.

A connector 40 is coupled to and extends from the upper member 20 of the second frame 14. The connector 40 is pivotally coupled to the upper member 20 of the first frame 12 so that the second frame 14 is selectively pivotable relative to the first frame 12. The connector 40 comprises a connecting tube 42 and a pair of compression fittings 44 or other hinging means, such as, but not limited to, a hinge, a pivot ball, and the like. The connecting tube 42 is coupled to and extends between the upper member 20 of the second frame 14 and a center section 46 of the upper member 20 of the first frame 12. Each compression fitting 44 is coupled to a respective opposing end section 48 of the upper member 20 of the first frame 12 and selectively couplable to the center section 46 of the upper member 20 of the first frame 12. The compression fittings 44 are configured to be loosened so that the center section 46 is selectively rotatable relative to the opposing end sections 48 to pivot the second frame 14 relative to the first frame 12 to a desired configuration. The compression fittings 44 are configured to be tightened to fixedly position the second frame 14 and the first frame 12 in the desired configuration.

Figure 2:
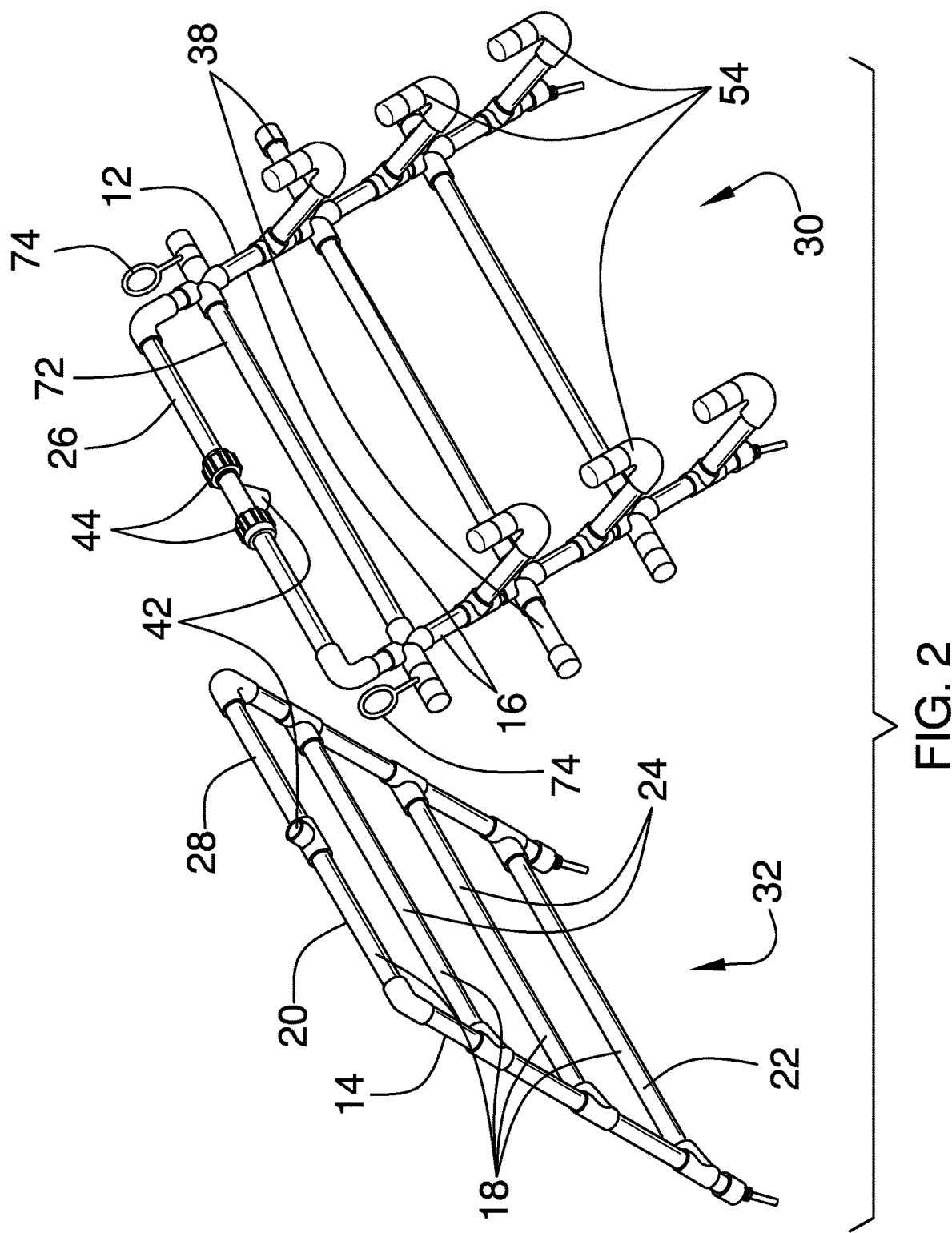
FIG. 2 is an exploded view of an embodiment of the disclosure.
Figure 3:
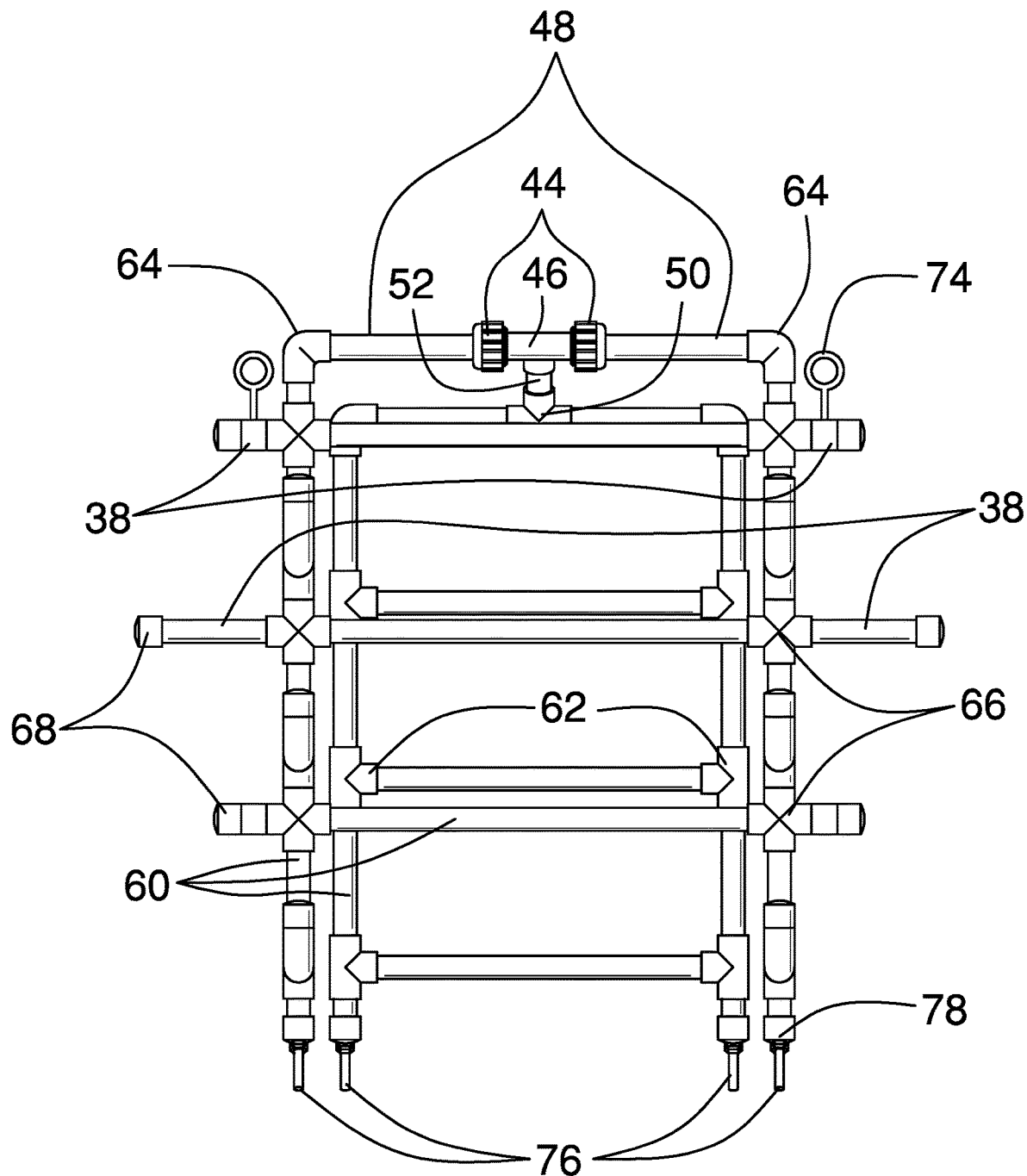
FIG. 3 is a front view of an embodiment of the disclosure.
Figure 4:
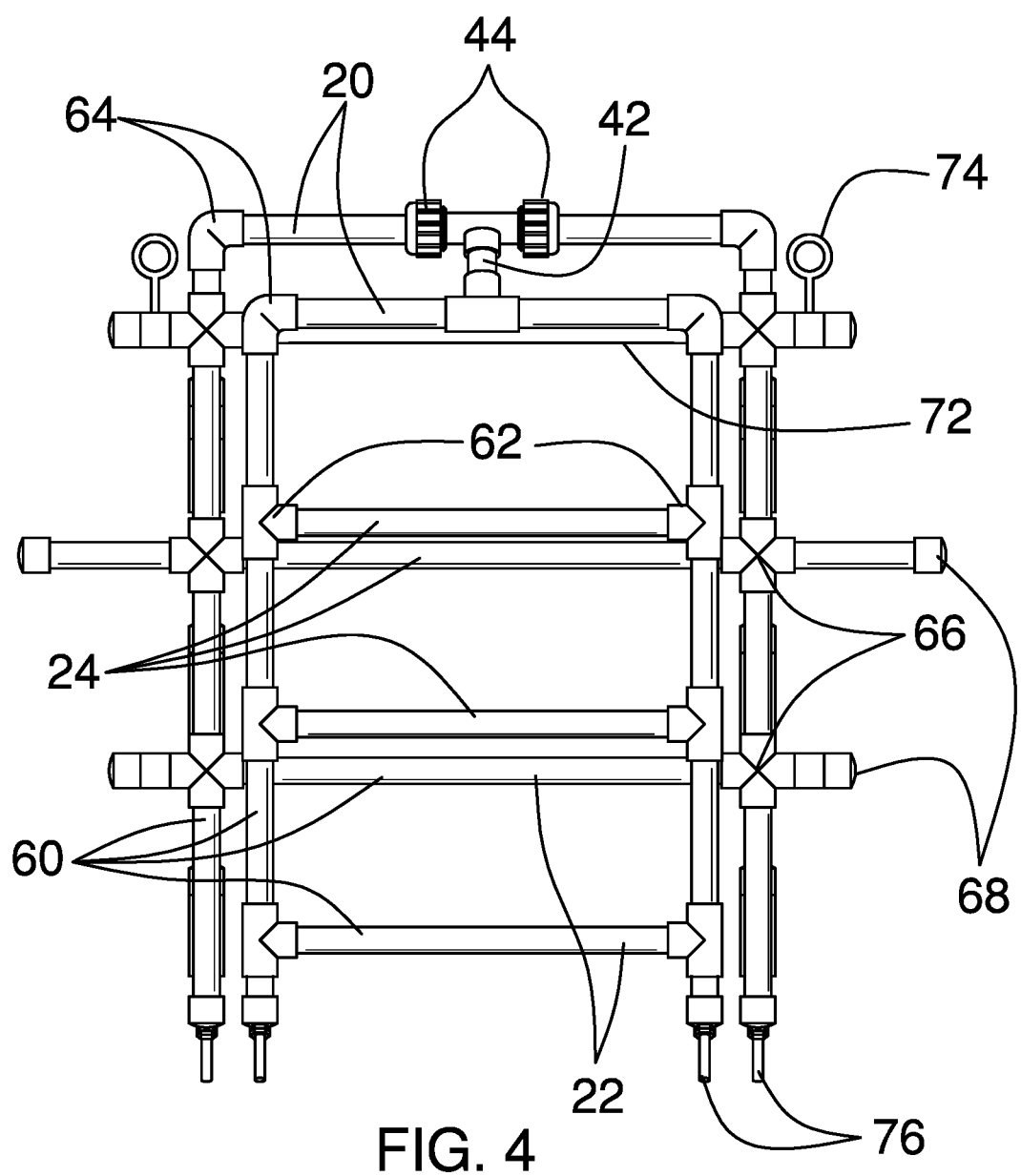
FIG. 4 is a rear view of an embodiment of the disclosure.
Figure 5:
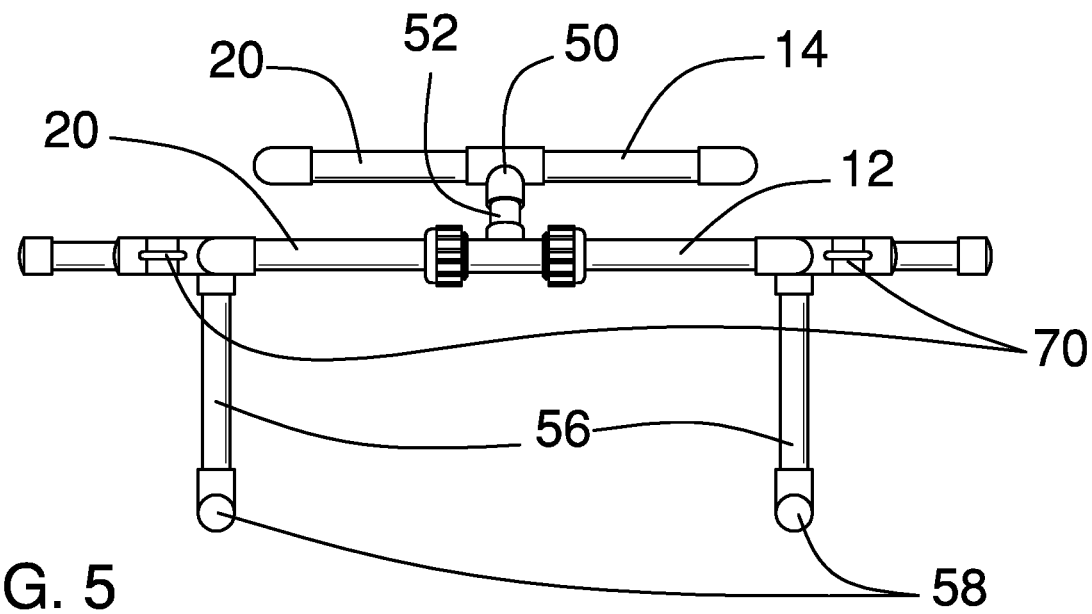
FIG. 5 is a top view of an embodiment of the disclosure.

The connecting tube 42 comprises a first segment 50 that is coupled to the upper member 20 of the second frame 14 and a second segment 52 that is coupled to the center section 46 of the upper member 20 of the first frame 12. The second segment 52 is circumferentially smaller than the first segment 50 so that the second segment 52 is selectively insertable into the first segment 50 to removably couple the first frame 12 to the second frame 14, as shown in FIG. 2.

Each of a plurality of arms 54 is coupled to and extends from the first frame 12 proximate to the first side 34 of the first frame 12. The arm 54 is horizontally aligned with an associated arm 54 that is positioned proximate to the second side 36 of the first frame 12 so that the arm 54 and the associated arm 54 are configured to support a fishing pole for transport.

Figure 6:
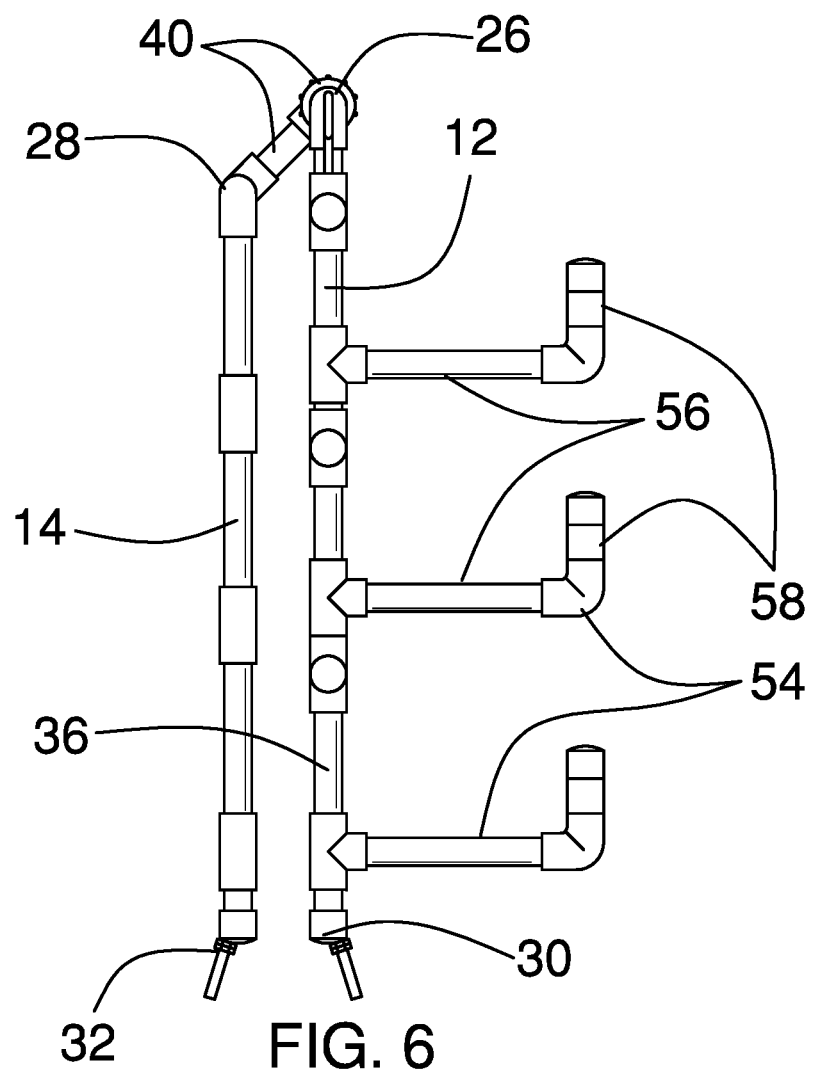
FIG. 6 is a side view of an embodiment of the disclosure.

Each arm 54 comprises a first section 56 and a second section 58. The first section 56 extends perpendicularly from the first frame 12, as shown in FIG. 6. The second section 58 is coupled to and extends perpendicularly from the first section 56 distal from the frame so that the arm 54 is hook shaped. The plurality of arms 54 may comprise from two to ten arms 54 that are evenly distributed between the first side 34 and the second side 36 of the first frame 12. The plurality of arms 54 may comprise from four to eight arms 54 that are evenly distributed between the first side 34 and the second side 36 of the first frame 12. The plurality of arms 54 may comprise six arms 54 that are positioned three apiece on the first side 34 and the second side 36 of the first frame 12.

The arms 54 are suitable for more than positioning fishing poles. For example, the arms 54 can be used for positioning rifles, collapsible chairs, and the like, for transport.

The arms 54, the first frame 12, and the second frame 14 may comprise tubes 60, tee fittings 62, 90° elbow fittings 64, socket cross fittings 66, and tube caps 68, or other combinations of elements and fastening means, such as, but not limited to, a combination of tubes and welds, a combination of dowels and screws, and the like. The arms 54, the first frame 12, and the second frame 14 may comprise rigid plastic or other rigid material, such as, but not limited to, wood, metal, and the like. The arms 54, the first frame 12, and the second frame 14 may comprise polyvinyl chloride or the like.

A pair of couplers 70 is coupled singly to the opposing terminal sections 38 of an uppermost medial member 72 of the first frame 12. Each coupler 70 is configured to selectively couple to a respective complementary fastener that is coupled to a respective opposing end of a strap (not shown) to removably couple the strap to the first frame 12. The strap thus is configured to position over a shoulder of a user the carry the first frame 12, the second frame 14, and the fishing pole that is supported by the arm 54 and the associated arm 54. Each coupler 70 comprises an eyebolt 74 or other coupling means, such as, but not limited to, a male side buckle fastener, a female side buckle fastener, a buckle, and the like. The eyebolt 74 is configured to be selectively coupled to a respective snap hook that is coupled to a respective opposing end of the strap to removably couple the strap to the first frame 12.

Each of a plurality of spikes 76 is coupled to and extends from a lower terminus 78 of a respective side member 16. The spikes 76 are configured to be inserted into a surface to couple the first frame 12 and the second frame 14 to the surface. The spikes 76 provide stability to the first frame 12 for positioning one or more fishing poles for fishing.

The spikes 76 that are coupled to the side members 16 of the first frame 12 extend transversely from the side members 16 towards the second frame 14. The spikes 76 that are coupled to the side members 16 of the second frame 14 extends transversely from the side members 16 towards the first frame 12. This configuration of the spikes 76 provides increased stability to the first frame 12 and the second frame 14 relative to a configuration wherein the spikes 76 extend linearly from the side members 16.

Figure 7:
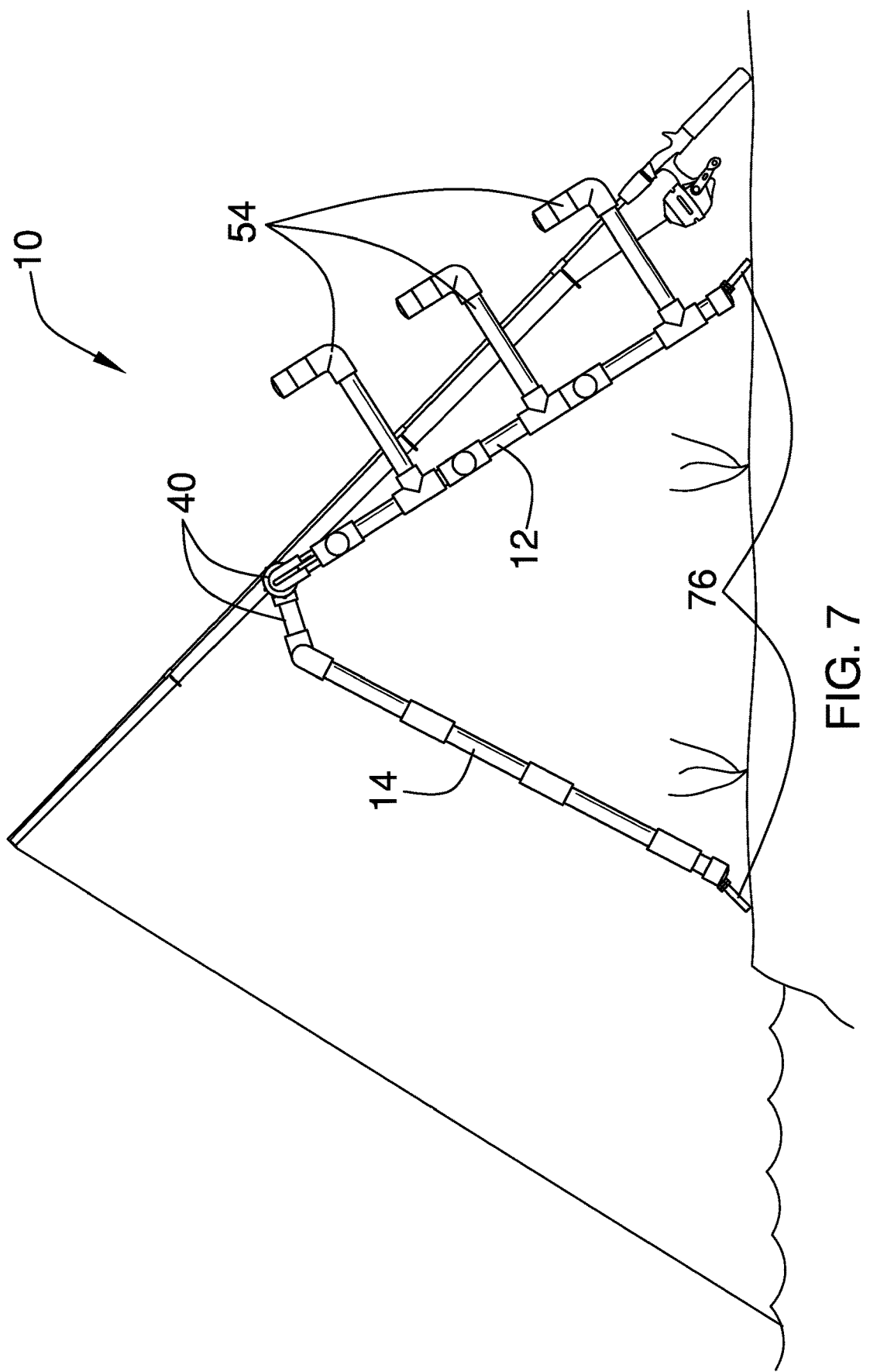
FIG. 7 is an in-use view of an embodiment of the disclosure.
Figure 8:
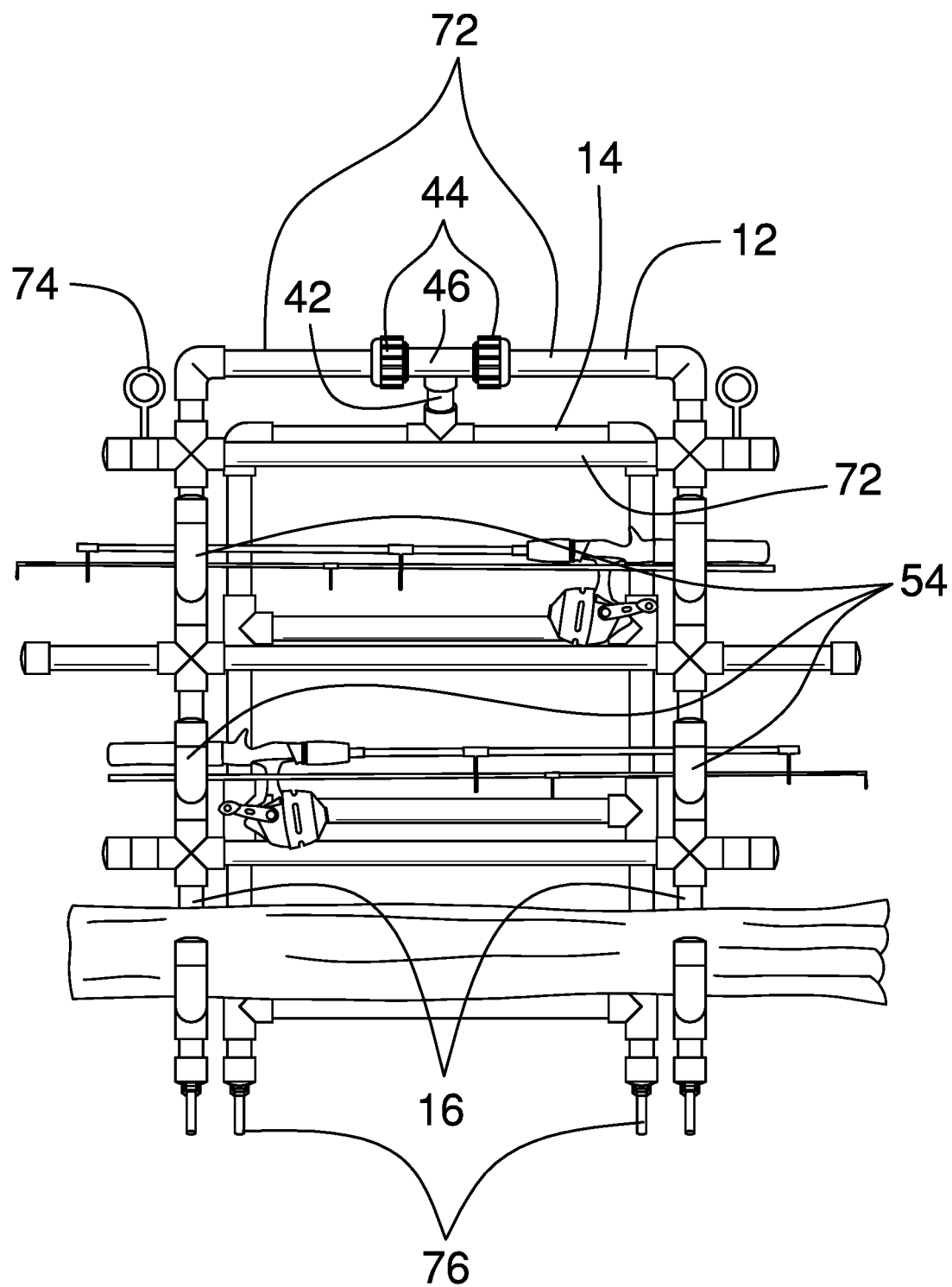
FIG. 8 is an in-use view of an embodiment of the disclosure.

In use, the device 10 is used to carry fishing poles and other items to a fishing spot, and then is positioned in the deployed configuration with the second frame 14 extending transversely from the first frame 12. The spikes 76 may be pushed into the surface to increase stability. The fishing poles are positioned against the first frame 12 while fishing, as shown in FIG. 7, allowing a hands-free fishing experience and preventing the fishing poles from being pulled into the water. The first frame 12 and the second frame 14 can be pivoted to the stowed configuration, with the fishing poles positioned across the arms 54, for storage of the device 10 and the fishing poles, as shown in FIG. 8.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A fishing pole caddy and fishing pole holder assembly comprising:
    a first frame pivotally coupled to a second frame wherein the first frame and the second frame are configured for selectively positioning in a stowed configuration with the first frame and the second frame substantially parallel and abutting, and a deployed configuration with the second frame extending transversely from the first frame wherein the first frame and the second frame are inverted V-shaped and the first frame is configured for supporting a fishing pole for fishing, the first frame and the second frame each comprising a pair of side members and a plurality of crossmembers, each crossmember being coupled to and extending between the pair of side members such that the first frame and the second frame both are substantially rectangularly shaped, the plurality of crossmembers comprising an upper member, a lower member, and a plurality of medial members, the plurality of medial members comprising from one to four medial members, the upper member of the first frame defining an upper end of the first frame, the upper member of the second frame defining an upper limit of the second frame, the lower member of the first frame being positioned proximate to a lower end of the first frame, the lower member of the second frame being positioned proximate to a lower limit of the second frame;
    a plurality of arms, each arm being coupled to and extending from the first frame proximate to the first side of the first frame such that the arm is horizontally aligned with an associated arm positioned proximate to the second side of the first frame wherein the arm and the associated arm are configured for supporting a fishing pole for transport; and
    a plurality of spikes, each spike being coupled to and extending from a lower terminus of a respective side member wherein the spikes are configured for inserting into a surface for coupling the first frame and the second frame to the surface, the spikes coupled to the side members of the first frame extending transversely from the side members towards the second frame, the spikes coupled to the side members of the second frame extending transversely from the side members towards the first frame.

2. The assembly of claim 1, further including the plurality of medial members comprising two medial members.

3. The assembly of claim 1, further including the medial members of the first frame extending past the first side and the second side of the first frame wherein opposing terminal sections of each medial member are configured for hanging articles.

4. The assembly of claim 1, further including a connector coupled to and extending from the upper member of the second frame, the connector being pivotally coupled to the upper member of the first frame such that the second frame is selectively pivotable relative to the first frame.

5. The assembly of claim 4, further including the connector comprising a connecting tube and a pair of compression fittings, the connecting tube being coupled to and extending between the upper member of the second frame and a center section of the upper member of the first frame, each compression fitting being coupled to a respective opposing end section of the upper member of the first frame and selectively couplable to the center section of the upper member of the first frame wherein the compression fittings are configured for loosening such that the center section is selectively rotatable relative to the opposing end sections for pivoting the second frame relative to the first frame to a desired configuration and wherein the compression fittings are configured for tightening for fixedly positioning the second frame and the first frame in the desired configuration.

6. The assembly of claim 5, further including the connecting tube comprising a first segment coupled to the upper member of the second frame and a second segment coupled to the center section of the upper member of the first frame, the second segment being circumferentially smaller than the first segment such that the second segment is selectively insertable into the first segment for removably coupling the first frame to the second frame.

7. The assembly of claim 1, further including each arm comprising a first section and a second section, the first section extending perpendicularly from the first frame, the second section being coupled to and extending perpendicularly from the first section distal from the frame such that the arm is hook shaped, the plurality of arms comprising from two to ten arms evenly distributed between the first side and the second side of the first frame.

8. The assembly of claim 7, further including the plurality of arms comprising from four to eight arms evenly distributed between the first side and the second side of the first frame.

9. The assembly of claim 8, further including the plurality of arms comprising six arms positioned three apiece on the first side and the second side of the first frame.

10. The assembly of claim 7, further including the arms, the first frame, and the second frame comprising tubes, tee fittings, 90° elbow fittings, socket cross fittings, and tube caps.

11. The assembly of claim 1, further including the arms, the first frame, and the second frame comprising rigid plastic.

12. The assembly of claim 11, further including the arms, the first frame, and the second frame comprising polyvinyl chloride.

13. The assembly of claim 3, further including a pair of couplers coupled singly to the opposing terminal sections of an uppermost medial member of the first frame, each coupler being configured for selectively coupling to a respective complementary fastener coupled to a respective opposing end of a strap for removably coupling the strap to the first frame such that the strap is configured for positioning over a shoulder of a user for carrying the first frame, the second frame, and the fishing pole supported by the arm and the associated arm.

14. A fishing pole caddy and fishing pole holder assembly comprising:
    a first frame pivotally coupled to a second frame wherein the first frame and the second frame are configured for selectively positioning in a stowed configuration with the first frame and the second frame substantially parallel and abutting, and a deployed configuration with the second frame extending transversely from the first frame wherein the first frame and the second frame are inverted V-shaped and the first frame is configured for supporting a fishing pole for fishing, the first frame and the second frame each comprising a pair of side members and a plurality of crossmembers, each crossmember being coupled to and extending between the pair of side members such that the first frame and the second frame both are substantially rectangularly shaped, the plurality of crossmembers comprising an upper member, a lower member, and a plurality of medial members, the plurality of medial members comprising from one to four medial members, the upper member of the first frame defining an upper end of the first frame, the upper member of the second frame defining an upper limit of the second frame, the lower member of the first frame being positioned proximate to a lower end of the first frame, the lower member of the second frame being positioned proximate to a lower limit of the second frame, the medial members of the first frame extending past the first side and the second side of the first frame wherein opposing terminal sections of each medial member are configured for hanging articles;

a plurality of arms, each arm being coupled to and extending from the first frame proximate to the first side of the first frame such that the arm is horizontally aligned with an associated arm positioned proximate to the second side of the first frame wherein the arm and the associated arm are configured for supporting a fishing pole for transport; and a pair of couplers coupled singly to the opposing terminal sections of an uppermost medial member of the first frame, each coupler being configured for selectively coupling to a respective complementary fastener coupled to a respective opposing end of a strap for removably coupling the strap to the first frame such that the strap is configured for positioning over a shoulder of a user for carrying the first frame, the second frame, and the fishing pole supported by the arm and the associated arm, each coupler comprising an eyebolt wherein the eyebolt is configured for selectively coupling to a respective snap hook coupled to a respective opposing end of the strap for removably coupling the strap to the first frame.

15. A fishing pole caddy and fishing pole holder assembly comprising:

a first frame pivotally coupled to a second frame wherein the first frame and the second frame are configured for selectively positioning in a stowed configuration with the first frame and the second frame substantially parallel and abutting, and a deployed configuration with the second frame extending transversely from the first frame wherein the first frame and the second frame are inverted V-shaped and the first frame is configured for supporting a fishing pole for fishing, the first frame and the second frame each comprising a pair of side members and a plurality of crossmembers, each crossmember being coupled to and extending between the pair of side members such that the first frame and the second frame both are substantially rectangularly shaped, the plurality of crossmembers comprising an upper member, a lower member, and a plurality of medial members, the upper member of the first frame defining an upper end of the first frame, the upper member of the second frame defining an upper limit of the second frame, the lower member of the first frame being positioned proximate to a lower end of the first frame, the lower member of the second frame being positioned proximate to a lower limit of the second frame, the plurality of medial members comprising from one to four medial members, the plurality of medial members comprising two medial members, the medial members of the first frame extending past a first side and a second side of the first frame wherein opposing terminal sections of each medial member are configured for hanging articles;

a connector coupled to and extending from the upper member of the second frame, the connector being pivotally coupled to the upper member of the first frame such that the second frame is selectively pivotable relative to the first frame, the connector comprising a connecting tube and a pair of compression fittings, the connecting tube being coupled to and extending between the upper member of the second frame and a center section of the upper member of the first frame, each compression fitting being coupled to a respective opposing end section of the upper member of the first frame and selectively couplable to the center section of the upper member of the first frame wherein the compression fittings are configured for loosening such that the center section is selectively rotatable relative to the opposing end sections for pivoting the second frame relative to the first frame to a desired configuration and wherein the compression fittings are configured for tightening for fixedly positioning the second frame and the first frame in the desired configuration, the connecting tube comprising a first segment coupled to the upper member of the second frame and a second segment coupled to the center section of the upper member of the first frame, the second segment being circumferentially smaller than the first segment such that the second segment is selectively insertable into the first segment for removably coupling the first frame to the second frame;

a plurality of arms, each arm being coupled to and extending from the first frame proximate to the first side of the first frame such that the arm is horizontally aligned with an associated arm positioned proximate to the second side of the first frame wherein the arm and the associated arm are configured for supporting a fishing pole for transport, each arm comprising a first section and a second section, the first section extending perpendicularly from the first frame, the second section being coupled to and extending perpendicularly from the first section distal from the frame such that the arm is hook shaped, the plurality of arms comprising from two to ten arms evenly distributed between the first side and the second side of the first frame, the plurality of arms comprising from four to eight arms evenly distributed between the first side and the second side of the first frame, the plurality of arms comprising six arms positioned three apiece on the first side and the second side of the first frame, the arms, the first frame, and the second frame comprising tubes, tee fittings, 90° elbow fittings, socket cross fittings, and tube caps, the arms, the first frame, and the second frame comprising rigid plastic, the arms, the first frame, and the second frame comprising polyvinyl chloride;

a pair of couplers coupled singly to the opposing terminal sections of an uppermost medial member of the first frame, each coupler being configured for selectively coupling to a respective complementary fastener coupled to a respective opposing end of a strap for removably coupling the strap to the first frame such that the strap is configured for positioning over a shoulder of a user for carrying the first frame, the second frame, and the fishing pole supported by the arm and the associated arm, each coupler comprising an eyebolt wherein the eyebolt is configured for selectively coupling to a respective snap hook coupled to a respective opposing end of the strap for removably coupling the strap to the first frame; and a plurality of spikes, each spike being coupled to and extending from a lower terminus of a respective side member wherein the spikes are configured for inserting into a surface for coupling the first frame and the second frame to the surface, the spikes coupled to the side members of the first frame extending transversely from the side members towards the second frame, the spikes coupled to the side members of the second frame extending transversely from the side members towards the first frame.

* * * * *